(12) United States Patent
Van Rooyen et al.

(10) Patent No.: US 8,572,134 B2
(45) Date of Patent: Oct. 29, 2013

(54) TRANSFORMING AND STORING MESSAGES IN A DATABASE

(75) Inventors: Reinier Van Rooyen, Frisco, TX (US); Richard A. Mandel, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 200 days.

(21) Appl. No.: 13/163,894

(22) Filed: Jun. 20, 2011

(65) Prior Publication Data

US 2012/0323978 A1    Dec. 20, 2012

(51) Int. Cl.
*G06F 15/16* (2006.01)
*G06F 17/20* (2006.01)

(52) U.S. Cl.
USPC .......................................... 707/812; 707/950

(58) Field of Classification Search
USPC .................................................. 707/812, 950
See application file for complete search history.

(56) References Cited

U.S. PATENT DOCUMENTS

| 5,319,777 | A | 6/1994 | Perez |
| 6,104,811 | A | 8/2000 | Aiello et al. |
| 7,281,133 | B2 | 10/2007 | Ginter et al. |
| 2002/0049815 | A1 | 4/2002 | Dattatri |
| 2004/0153511 | A1* | 8/2004 | Maynard et al. ............... 709/206 |
| 2004/0162772 | A1* | 8/2004 | Lewis ............................... 705/34 |
| 2007/0239898 | A1* | 10/2007 | Friend et al. ................... 709/248 |
| 2009/0063883 | A1 | 3/2009 | Mori |
| 2009/0125506 | A1* | 5/2009 | Kim .................................. 707/5 |
| 2011/0099351 | A1 | 4/2011 | Condict |
| 2011/0258115 | A1* | 10/2011 | Mulhim ........................ 705/42 |

OTHER PUBLICATIONS

U.S. Patent and Trademark Office Official Action in U.S. Appl. No. 13/163,919, dated Nov. 30, 2012, 12 pages.
Mandel, U.S. Appl. No. 13/163,919, filed Jun. 20, 2011, 47 pages, "Identifying Duplicate Messages in a Database".
U.S. Patent and Trademark Office Official Action in U.S. Appl. No. 13/163,919, dated Jun. 17, 2013, 12 pages.

* cited by examiner

*Primary Examiner* — Alex Gofman
(74) *Attorney, Agent, or Firm* — Michael A. Springs (57) ABSTRACT

A system for storing messages in an on-disk database (ODDB), comprises an interface operable to receive a first message comprising first data from an execution venue, wherein the first message is one of a group of associated messages related to a financial transaction, a processor communicatively coupled to the interface, the processor is operable to load the first message into an in-memory database (IMDB), identify a second message in the group of associated messages, transform the second message with the first data from the first message, and determine whether all messages in the associated group of messages have been loaded into the IMDB, and the interface is further operable to transfer the first message to the ODDB.

15 Claims, 5 Drawing Sheets

TRANSFORMING AND STORING MESSAGES IN A DATABASE

TECHNICAL FIELD

The present invention relates generally to data organization and, more specifically, to transforming and storing messages in a database.

BACKGROUND

Enterprises often store large numbers of messages in databases. An enterprise may need to transform the messages stored in the database. Performing transformations on messages stored in large databases can consume large amounts of time and computing resources.

SUMMARY OF THE DISCLOSURE

In accordance with the present invention, disadvantages and problems associated with previous techniques for transforming and storing messages in databases may be reduced or eliminated.

According to one embodiment of the present invention, a system for storing messages in an on-disk database (ODDB), comprises an interface operable to receive a first message comprising first data from an execution venue, wherein the first message is one of a group of associated messages related to a financial transaction, a processor communicatively coupled to the interface, the processor is operable to load the first message into an in-memory database (IMDB), identify a second message in the group of associated messages, transform the second message with the first data from the first message, and determine whether all messages in the associated group of messages have been loaded into the IMDB, and the interface is further operable to transfer the first message to the ODDB.

According to another embodiment of the present invention, a non-transitory computer readable medium comprises logic for storing messages in an on-disk database (ODDB), the logic, when executed by a processor, operable to receive a first message comprising first data from an execution venue, wherein the first message is one of a group of associated messages related to a financial transaction, load the first message into an in-memory database (IMDB), identify a second message in the group of associated messages, transform the second message with the first data from the first message, determine whether all messages in the associated group of messages have been loaded into the IMDB, and transfer the first message to the ODDB.

According to yet another embodiment of the present invention, a method for storing messages in an on-disk database (ODDB), comprises receiving a first message comprising first data from an execution venue, wherein the first message is one of a group of associated messages related to a financial transaction, loading the first message into an in-memory database (IMDB), identifying a second message in the group of associated messages, transforming, using a processor, the second message with the first data from the first message, determining whether all messages in the associated group of messages have been loaded into the IMDB, and transferring the first message to the ODDB.

Certain embodiments of the invention may provide one or more technical advantages. A technical advantage of one embodiment includes reducing the time and computing resources necessary to perform transformations on messages stored in a database. Enterprises often support databases, particularly large databases, with high-capacity memory devices such as hard disk drives (HDDs). However, high-capacity memory devices often have slower read or write times than other types of memory devices, such as semiconductor memory devices. High-capacity, slow read or write time memory devices may be tens to hundreds of times slower than other, faster memory devices. An enterprise may reduce the time and computing resources necessary to search, transform, and store messages by performing transformations on messages in a memory device with faster read or write times before loading the messages into another memory device with slower read or write times.

Another technical advantage of an embodiment is that performing transformations on messages in a faster memory device before loading the messages into a slower memory device may reduce the amount of memory required to store the messages. Yet another technical advantage of an embodiment is that performing message transformations in a faster memory device prior to loading the messages into a slower memory devices reduces the time and computing resources necessary to retrieve the messages once they are stored in the slower memory device.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
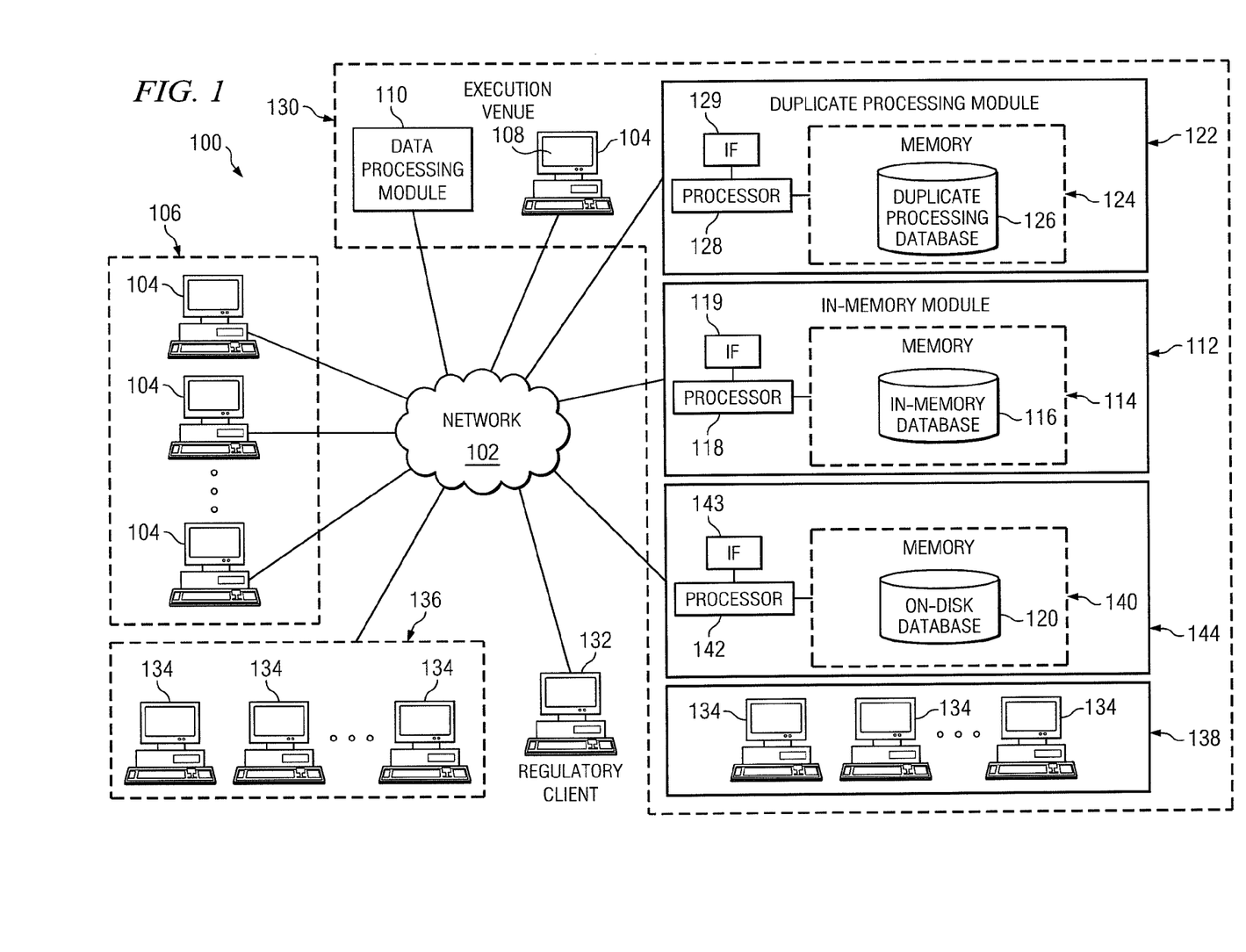
FIG. 1 illustrates an embodiment of a system for transforming and storing messages in a database.

FIG. 1 illustrates an embodiment of system 100 for transforming and storing messages in a database. System 100 may comprise network 102, one or more execution venues 104, enterprise 130, regulatory client 132, and one or more clients 134. Enterprise 130 may include data processing module 110, execution venue 104, duplicate processing module 122, in-memory module 114, on-disk module 144, and clients 134.

Enterprise 130 often stores large numbers of messages in high-capacity memory devices. However, high capacity memory devices, such as hard disk drives (HDDs), often have slower read and write times than other available memory devices, such as semiconductor memory. HDDs include optical, magnetic, or any other storage device that mechanically orients a storage medium in relation to a read or write head to read or write data. Semiconductor memory includes any suitable memory device that utilizes integrated circuits as a storage medium. In an embodiment, enterprise 130 may communicate large numbers of messages with entities, such as clients 134 or execution venues 104. Enterprise 130 may need to store these messages in a database for record keeping or for reporting to regulatory client 132. Enterprise 130 may need to normalize these messages to a standard format and may further need to transform some messages with information from other messages. Searching for, formatting, transforming, and storing messages in a memory device with slow read or write times can require large amounts of time and computing resources. It may be advantageous for enterprise 130 to normalize and transform messages faster and with fewer computing resources before loading the messages into a memory device with slow read or write times. This may improve the speed in which messages are loaded and may consume fewer computing resources.

To facilitate formatting messages quickly and efficiently, system 100 may direct messages from execution venues 104 and clients 134 to in-memory module 112 over network 102. In an embodiment, in-memory module 112 performs transformations of messages in a memory device with faster read or write times, for example semiconductor memory, before transferring the messages to on-disk database 120 stored on a memory device with slower read or write times.

Message transformations may include adding data to messages, replacing data in messages, removing data from messages, re-ordering data in a message, or any other suitable data manipulation. In an embodiment, data from a first message may be added to a second message. In another embodiment, data in a message may be in a long form that may be replaced with data in short form to reduce the size of the message and the memory necessary to store it. In yet another embodiment, data in a message may be in a first format, and in-memory module 112 may transform the data from a first format to a second, standard format. Enterprise 130 may store messages in one or more standard formats, for example, to maintain data in a consistent format to improve searching, storing, retrieving, and transmitting the messages. A standard format used by enterprise 130 may include size requirements, such as a preferred message size or a maximum message size.

Enterprises 130 often receive duplicate messages from entities. To avoid storing duplicate messages, in an embodiment, system 100 directs messages to duplicate processing module 122 to determine whether a message is a duplicate of a previously received message. If duplicate processing module 122 determines that a message is a duplicate, system 100 may remove the duplicate message. If duplicate processing module 122 determines that a message is not a duplicate, system 100 communicates the message to its destination, such as in-memory module 112.

Network 102 represents any suitable network operable to facilitate communication between the components of system 100 such as enterprise 130, data processing module 110, execution venues 104, duplicate processing module 122, in-memory module 112, on-disk module 144, clients 134, and regulatory client 132. Network 102 may include any interconnecting system capable of transmitting audio, video, signals, data, messages, or any combination of the preceding. Network 102 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Execution venues 104 represent components that participate in financial markets and are operable to exchange financial instruments. Financial instruments may refer to stocks, bonds, securities, mutual funds, currencies, commodities, derivatives, debt, or any other evidence of an ownership interest, contractual right to receive or deliver, or instrument embodying or conveying monetary value. Execution venues 104 receive and process messages relating to transactions of financial instruments, such as orders to trade financial instruments. Execution venue 104 may be external to enterprise 130 or internal to enterprise 130. When operating internally to enterprise 130, execution venue 104 may receive a large number of messages containing orders to trade financial instruments. For example, enterprise 130 receives a number of orders from sellers and matches potential buyers with the sellers. Enterprise 130 may receive a message from a first client 134 with an order to sell 1,000 shares of stock Alpha, and a message from a second client 134 with an order to buy 1,000 shares of stock Alpha. In this situation, internal execution venue 104 fulfills both orders within enterprise 130.

Execution venues 104 may also be external to enterprise 130. For example, enterprise 130 may receive an order from client 134 to buy 1,000 shares of stock Beta that enterprise 130 cannot fulfill internally. Enterprise 130 may submit the order to external execution venue 104 to find a seller offering 1,000 shares of Beta to fulfill the order.

Clients 134 represent components that communicate messages with enterprise 130 and/or within enterprise 130. In an embodiment, clients 134 communicate messages relating to trading financial instruments. Messages from client 134 may include orders to trade financial instruments or other supplemental information related to trades of financial instruments. In particular embodiments, clients 134 represent general or special-purpose computers operating software applications capable of performing the above-described operations. For example, clients 134 may include, but are not limited to, laptop computers, desktop computers, portable data assistants (PDAs), smart phones, and/or portable media players. In some embodiments, client 134 comprises a general-purpose personal computer (PC), a Macintosh, a workstation, a Unix-based computer, a server computer, or any suitable processing device.

Additionally, in particular embodiments, client 134 may include one or more processors operable to execute computer logic and/or software encoded on non-transitory tangible media that performs the described functionality. Client 134 may also include one or more computer input devices, such as a keyboard, trackball, or a mouse, and/or one or more Graphical User Interfaces (GUIs), through which a user may interact with the logic executing on the processor of client 134. In general, client 134 includes any appropriate combination of hardware, software, and/or encoded logic suitable to perform the described functionality. Clients 134 may couple to network 102 through a dedicated wired or wireless connection, or may connect to network 102 only as needed to receive, transmit, or otherwise execute applications. In other embodiments, clients 134 may be internal to enterprise 130. Although FIG. 1 illustrates, for purposes of example, a particular number and type of clients 134, alternative embodiments of system 100 may include any appropriate number and type of clients 134, depending on the particular configuration of system 100.

Enterprise 130 represents any entity that stores a large number of messages in a database. Enterprise 130 may refer to a financial institution, such as a bank, however, enterprise 130 represents any suitable type of entity in any suitable industry. Enterprise 130 may have different business units, or subdivisions that handle different business activities. For example, a retirement group, a call center, a wealth management group, an information technology group, a human resources group, a loan group, a banking group, a risk management group, and a global financial group represent different business units associated with enterprise 130. In an embodiment, enterprise 130 includes data processing module 110, internal execution venue 104, duplicate processing module 122, in-memory module 114, on-disk module 144, and internal clients 138.

A module within enterprise 130 may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions a module may be performed by any suitable combination of one or more servers or other components at one or more locations. In the embodiment where the module is a server, the server may be a private server, and the server may be a virtual or physical server. Also, a module may include any suitable component that functions as a server.

Data processing module 110 represents a component within enterprise 130 that facilitates the communication of messages with enterprise 130 and within subdivisions of enterprise 130. In an embodiment, data processing module 110 may include systems that process orders for financial instruments such as trading platforms, order routers, applications to enter or manage orders, or other internal systems to support transacting financial instruments.

Duplicate processing module 122 processes messages to determine the existence of potentially duplicative information. In an embodiment, duplicate processing module 122 receives messages from network 102 and verifies that the messages are not duplicates of messages previously received by duplicate processing module 122. If duplicate processing module 122 identifies a message as a duplicate, duplicate processing module 122 facilitates the removal of the message. If the message is not a duplicate, duplicate processing module 122 facilitates communication of the message to its destination in enterprise 130. In an embodiment, duplicate processing module 122 communicates non-duplicate messages to in-memory module 112. Duplicate processing module 122 will be explained in more detail below with respect to FIGS. 4 and 5.

In the illustrated embodiment, duplicate processing module 122 comprises processor 128, interface 129, and memory 124, which includes duplicate processing database 126. Processor 128 communicatively couples to interface 129, memory 124, and duplicate processing database 126, and controls the operation and administration of duplicate processing module 122 by processing information received from network 102, memory 124, and duplicate processing database 126. Processor 128 includes any hardware and/or software that operates to control and process information. Processor 128 may be a programmable logic device, a microcontroller, a microprocessor, any suitable processing device, or any suitable combination of the preceding.

Interface 129 represents any suitable device operable to receive information from network 102, execution venues 104, data processing module 110, in-memory module 112, on-disk module 144, clients 134, and/or regulatory client 132, transmit information through network 102, perform processing of information, communicate to other devices, or any combination of the preceding. Interface 129 represents any port or connection, real or virtual, including any suitable hardware and/or software, including protocol conversion and data processing capabilities, to communicate through network 102 that allows duplicate processing module 122 to exchange information with execution venues 104, data processing module 110, in-memory module 112, on-disk module 144, clients 134, regulatory client 132, or other components of system 100.

Memory 124 may store, either permanently or temporarily, data, operational software, or other information for processor. Memory 124 includes any one or a combination of volatile or non-volatile local or remote devices suitable for storing information. For example, memory may include random access memory (RAM), read only memory (ROM), magnetic storage devices, optical storage devices, semiconductor storage devices, or any other suitable information storage device or a combination of these devices. While illustrated as including particular types of data, memory 124 may include any suitable information for use in the operation of duplicate processing module 122. Memory 124 will be explained in more detail below with respect to FIGS. 4 and 5.

Duplicate processing database 126 represents one or more databases in memory 124 operable to store data that identifies messages received by duplicate processing module 122. In an embodiment, duplicate processing database 126 includes an array comprising a number of array elements. Array elements represent sections of memory 124. Array elements may have a uniform size, and may be uniquely identifiable by their location relative to an origin point of the array. Duplicate processing database 126 will be explained in more detail below with respect to FIGS. 4 and 5.

In-memory module 112 facilitates the transformation of messages communicated to enterprise 130 into a suitable format for use by the components within enterprise 130. Transformations may include any one or a combination of adding data to a message, removing data from a message, replacing data in a message, changing the order of data in a message, dividing a message into multiple messages, changing the size of the message, or any other suitable data transformation.

In an embodiment, in-memory module 112 may add data from a first message to a second message. In another embodiment, in-memory module 112 may replace long form data in a message with short form data that requires less memory to store. In yet another embodiment, in-memory module 112 may transform the format of messages to one or more standard formats used by enterprise 130 to maintain consistency in the messages.

A standard format may include particular fields of data, a particular order of data, a particular file format, a particular message size or range of message sizes, or any other suitable criteria. For example, enterprise 130 may identify a particular standard format that provides for improved searching, transmitting, transforming, or storing of messages. Enterprise 130 may determine a particular standard format based on characteristics of system 100 including enterprise 130, in-memory database 116, and on-disk database 120. Enterprise 130 may employ a number of standard formats that correspond to different associated groups of messages. One associated group of messages may have a different standard format than another associated group of messages. Associated groups of messages may be defined by common transaction, common client, common time, common order type, or any other suitable characteristic of the messages.

In-memory module 112 represents any suitable component that facilitates receiving, transforming, and transmitting messages. In the illustrated embodiment, in-memory module 112 comprises processor 118, interface 119, and memory 114 that includes in-memory database 116. Processor 118 communicatively couples to interface 119, memory 114, and in-memory database 116, and controls the operation and administration of in-memory module 112 by processing information received from network 102, memory 114, and in-memory database 116. Processor 118 includes any hardware and/or software that operates to control and process information. Processor 118 may be a programmable logic device, a microcontroller, a microprocessor, any suitable processing device, or any suitable combination of the preceding.

Interface 119 represents any suitable device operable to receive information from network 102, execution venues 104, data processing module 110, duplicate processing module 122, on-disk module 144, clients 134, and/or regulatory client 132, transmit information through network 102, perform processing of information, communicate to other devices, or any combination of the preceding. Interface 119 represents any port or connection, real or virtual, including any suitable hardware and/or software, including protocol conversion and data processing capabilities, to communicate through network 102 that allows in-memory module 112 to exchange information with execution venues 104, data processing module 110, duplicate processing module 122, on-disk module 144, clients 134, regulatory client 132, or other components of system 100.

Memory 114 may store, either permanently or temporarily, data, operational software, or other information for processor 118. Memory 114 includes any one or a combination of volatile or non-volatile local or remote devices suitable for storing information. For example, memory may include random access memory (RAM), read only memory (ROM), magnetic storage devices, optical storage devices, semiconductor memory devices, or any other suitable information storage device or a combination of storage devices. While illustrated as including particular types of data, memory 114 may include any suitable information for use in the operation of in-memory module 112.

In an embodiment, memory 114 includes a memory device that stores in-memory database 116 that may search, transform, or store data faster than the memory device that stores on-disk database 120. For example, on-disk database 120 may be stored on HDD memory and in-memory database 116 may be stored on semiconductor memory. The memory device storing in-memory database 116 may be several orders of magnitude times faster at searching, transforming, or storing data than the memory device storing on-disk database 120. Additionally, the memory device storing in-memory database 116 may consume less computing resources than on-disk database 120.

In-memory database 116 represents one or more databases operable to store messages communicated with enterprise 130, such as messages sent by, received by, or transmitted within enterprise 130. In-memory database 116 may store large numbers of messages, e.g., 200,000,000 1,500 byte messages, or 300 gigabytes. In an exemplary embodiment, in-memory database 116 may hold messages until a signaling event occurs, such as a particular time period elapsing, before transferring the messages to on-disk module 144.

On-disk module 144 represents any suitable component that facilitates receiving, storing, and transmitting messages. In the illustrated embodiment, on-disk module 144 comprises processor 142, interface 143, and memory 140 that includes on-disk database 120. Processor 142 communicatively couples to interface 143, memory 140, and on-disk database 120, and controls the operation and administration of on-disk module 144 by processing information received from network 102, memory 140, and on-disk database 120. Processor 142 includes any hardware and/or software that operates to control and process information. Processor 142 may be a programmable logic device, a microcontroller, a microprocessor, any suitable processing device, or any suitable combination of the preceding.

Interface 143 represents any suitable device operable to receive information from network 102, execution venues 104, data processing module 110, duplicate processing module 122, in-memory module 112, clients 134, and/or regulatory client 132, transmit information through network 102, perform processing of information, communicate to other devices, or any combination of the preceding. Interface 143 represents any port or connection, real or virtual, including any suitable hardware and/or software, including protocol conversion and data processing capabilities, to communicate through network 102 that allows on-disk module 144 to exchange information with execution venues 104, data processing module 110, in-memory module 112, duplicate processing module 122, clients 134, regulatory client 132, or other components of system 100.

Memory 140 may store, either permanently or temporarily, data, operational software, or other information for processor 142. Memory 140 includes any one or a combination of volatile or non-volatile local or remote devices suitable for storing information. For example, memory may include random access memory (RAM), read only memory (ROM), magnetic storage devices, optical storage devices, semiconductor memory devices, or any other suitable information storage device. While illustrated as including particular types of data, memory 140 may include any suitable information for use in the operation of on-disk module 140.

In an embodiment, memory 140 includes a memory device that stores on-disk database 120 that may search, transform, or store data slower than the memory device that stores in-memory database 116. For example, on-disk database 120 may be stored on HDD memory and in-memory database 116 may be stored on semiconductor memory. On-disk database 120 represents one or more databases operable to store large numbers of messages. Enterprise 130 may use on-disk database 120 as a depository for messages communicated with enterprise 130. In an embodiment, on-disk database 120 receives and stores 200,000,000 1500 byte messages, or 300 gigabytes of messages, per day, for multiple years. Enterprise 130 may report messages from on-disk database 120 to regulatory client 132. In an embodiment, at the end of the day in-memory module 112 transmits messages accumulated by in-memory database 116 over the course of the day to on-disk module 140.

Regulatory client 132 represents a component that facilitates the regulatory function of an organization. In an embodiment, regulatory client 132 regulates financial transactions performed by enterprise 130 and may have particular reporting requirements. Enterprise 130 may, for example, be required to communicate some of the messages it receives or transmits to regulatory client 132. In an embodiment, regulatory client 132 may be used by one or more regulatory bodies, such as the Federal Trade Commission, the Securities and Exchange Commission, the Financial Industry Regulatory Authority or other body having regulatory authority over enterprise 130, clients 134, execution venues 104, or other entity communicating with enterprise 130.

In an exemplary embodiment of operation, clients 134, execution venues 104, and enterprise 130 communicate messages associated with transactions of financial instruments. Data processing module 110 controls the communication of messages with enterprise 130 and within subdivisions of enterprise 130. Messages may include orders to trade financial instruments. These orders may be fulfilled at one or more execution venues 104, either internal to or external to enterprise 130. Numerous messages may be generated relating to the order from various entities, such as enterprise 130, execution venues 104, or clients 134. Each entity may format messages relating to the order differently, and each message may contain different information.

Enterprise 130 may perform transformations on the messages from various entities to normalize the messages to a standard format to provide consistency to the messages. In-memory database 116 facilitates transforming the messages. Transformations of messages in in-memory database 116 may include any one or a combination of adding data to a message, removing data from a message, replacing data in a message, changing the order of data in a message, dividing a message into multiple messages, changing the size of the message, or any other suitable data transformation. In an embodiment, transformations include updating a first message with data from a second message. For example, enterprise 130 may associate a group of messages because they involve the same order for a financial instrument. A standard format for the associated group may require information that is in the last message of the associated group to be added to the first message of the associated group. For example, an average price list may only be recorded in the last message of an associated group, but a standard format for the associated group may require the average price list in the first message. In-memory module 112 may transform the first message to conform to the standard format by adding the total price list data from the last message to the first message. To facilitate transforming messages quickly and efficiently, in an embodiment, system 100 directs messages to in-memory module 112.

In another embodiment, in-memory module 112 may replace first data in a message with second data. For example, messages may contain long form data. Long form data represents data which may be represented by short form data that requires less memory to store. In-memory module 112 may maintain tables that associate long forms of data with short forms of data. For example, a "client ID" field may contain the data "Customer One." In-memory module 112 maintains a table that associates the long form data "Customer One" with the short form data "C1." Replacing long form data with short form data reduces the amount of memory required to store messages.

In another embodiment, messages received by in-memory database 116 may be in different formats. It may be advantageous for enterprise 130 to normalize messages into one or more standard formats. Enterprise 130 may employ a number of standard formats that relate to various associated groups of messages. Normalizing messages to a consistent message format may reduce the time and computing requirements necessary to search, transform, and store messages in on-disk database 120. In another example, enterprise 130 may report messages to regulatory client 132, and regulatory client 132 may have particular formatting requirements for messages.

A standard message format may include a message size or range of sizes. In an embodiment, enterprise 130 may evaluate the characteristics of system 100, such as characteristics of in-memory module 112 or on-disk module 144, to determine a standard format that facilitates efficient searching, transforming, transferring, or storing of messages. For example, enterprise 130 may determine a maximum message size for messages to be transferred to on-disk database 120, and in-memory module 112 may format all messages files to be smaller than the maximum size before transferring the messages to on-disk module 144.

In-memory module 112 may communicate messages to on-disk module 144 after in-memory module 112 has completed transformations of messages. In an embodiment, in-memory module 112 communicates messages to on-disk module 144 at a particular time, such as at the end of the day. In an example, messages may relate to transactions of financial instruments. Clients that interact in markets for these transactions, such as enterprise venues 104, may close at a particular time and in-memory module 112 may stop receiving messages for the day. After transforming all of the messages from the day, in-memory module 112 communicates the messages to on-disk module 144 for long term storage in on-disk database 120, and then removes the contents of in-memory database 116 to prepare for the next day's batch of messages.

Enterprise 130 may transmit messages to regulatory client 132. Enterprise may transmit messages from in-memory module 112, from on-disk module 144, or from other memory devices. In an embodiment, enterprise 130 reports to regulatory client 132 from on-disk database 120.

Any suitable component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory, tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 100. For example, messages may comprise any electronically communicable information. Enterprise 130 may store messages from entities other than those described in FIG. 1. Enterprise 130 may transfer messages from on-disk database 120 to other entities besides regulatory client 132.

Figure 2:
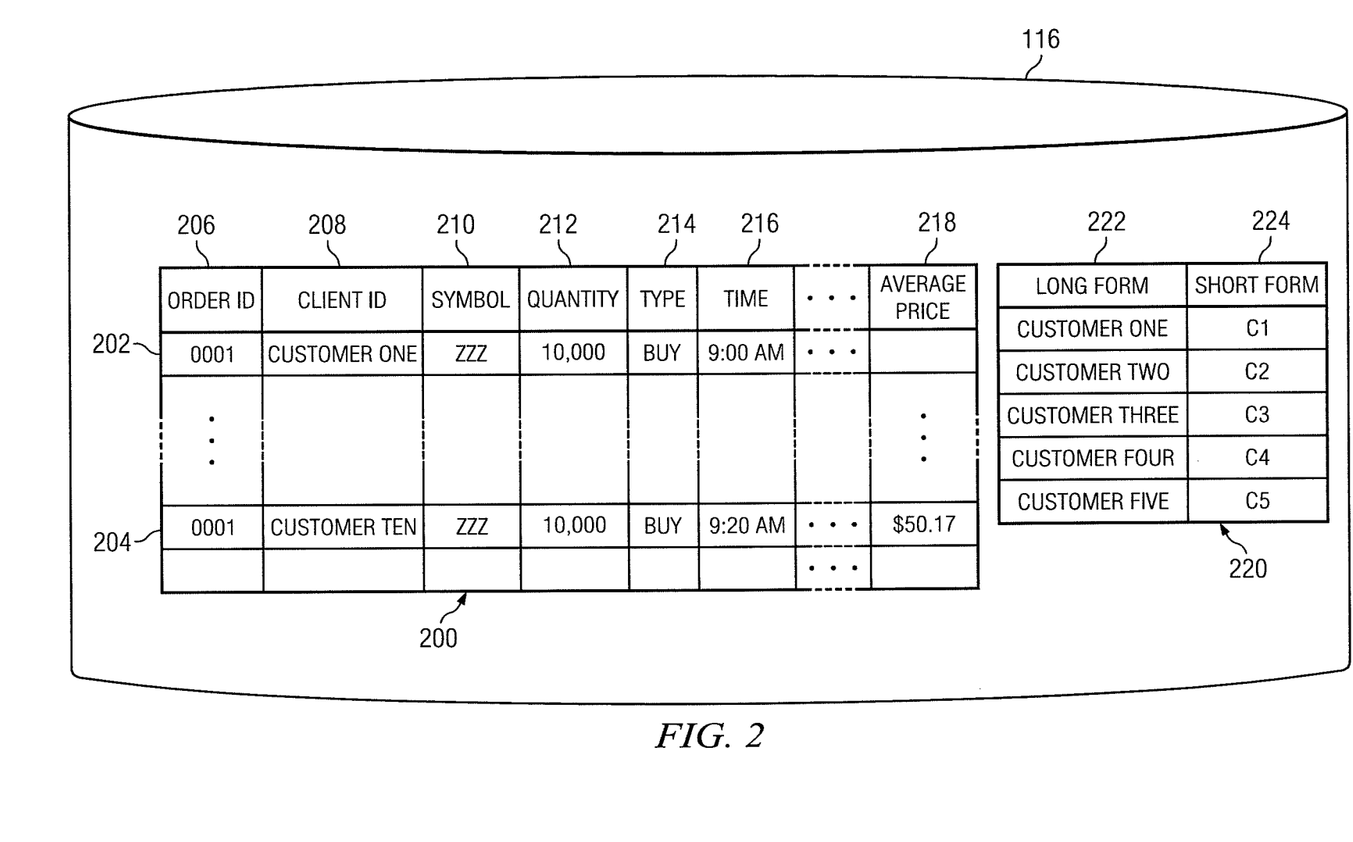
FIG. 2 illustrates an embodiment of an in-memory database.

FIG. 2 illustrates an embodiment of in-memory database 116. Enterprise 130 receives a large number of messages regarding financial transactions and enterprise 130 stores the messages in a database. Enterprise 130 stores the messages for internal records, to comply with regulations, or for any suitable purpose.

Enterprise 130 may store messages related to transactions of financial instruments, such as an order to trade a financial instrument. Orders may involve messages communicated among a number of components, such as clients 134, execution venues 104, regulatory client 132, and/or enterprise 130. Each component may use different formats for their messages, and each message may include different information.

In an embodiment, enterprise 130 transforms messages to a standard format, or a number of standard formats, to maintain consistency between the messages. A standard format may include particular fields of data, a particular order of data, a particular file format, a particular message size or range of message sizes, or any other suitable criteria. Transforming messages to comply with a standard format may include any one or a combination of adding data to a message, removing data from a message, replacing data in a message, changing the order of data in a message, dividing a message into multiple messages, changing the size of the message, or any other suitable data transformation.

In the illustrated embodiment, table 200 organizes data according to various fields, such as order ID field 206, client ID field 208, stock symbol field 210, order type field 214, transaction time field 216, and average price field 218. For example, in row 202, the order ID field 206 contains "0001," the client ID field 208 contains "Customer One," the symbol field 210 contains "ZZZ," the quantity field 212 contains "10,000," the type field 214 contains "Buy," the time field 216 contains "9:00 AM," and the average price field 218 does not contain any data.

In the illustrated embodiment, in-memory module 112 replaces first data in a message with second data. In-memory module 112 maintains one or more tables 220 that associate long forms 222 of data with short forms 224 of the data. For example, data in long form 222 may be replaced with data in short form 224. Data in a field may be in a long form, e.g., client ID field 208 may contain the data "Customer One." The data may be replaced with the short form 224 to consume less memory, e.g., "Customer One" is replaced with "C1."

In another embodiment, enterprise 130 may add data from second message 204 to first message 202. For example, first message 202 of an associated group of messages may not have data in the average price field 218, but second message 204 of the associated group may contain the average price, e.g., $50.17. A standard format for the associated group may require that first message 202 contain the average price data from second message 204. In-memory module 112 may transform first message 202 to contain average price data from second message 204 to conform to the standard format.

In another embodiment, messages received by in-memory database 116 may be in different formats. It may be advantageous for enterprise 130 to normalize messages into one or more standard formats. For example, normalizing messages to a standard message format may reduce the time and computing requirements required to search, transform, or store the messages. In an example, enterprise 130 may report messages to regulatory client 132, and regulatory client 132 may have particular formatting requirements for messages. In-memory module 112 may transform the messages to a standard format to comply with regulatory requirements. Transformations of messages to standard formats may include any one or a combination of adding data to a message, removing data from a message, replacing data in a message, changing the order of data in a message, dividing a message into multiple messages, changing the size of the message, or any other suitable data transformation.

A standard format may include a particular message size, or range of sizes. In an embodiment, enterprise 130 evaluates the properties of enterprise 130, such as in-memory database 116 or on-disk database 120, to determine a message size that facilitates efficient searching, transforming, storing, or transferring of messages. For example, enterprise 130 determines a maximum message size for messages to be transferred to on-disk database 120, and in-memory module 112 formats all messages to be smaller than the maximum size before transferring the messages to on-disk module 144.

Modifications, additions, or omissions may be made to in-memory database 116. For example, in-memory database 116 may include other tables than those illustrated in FIG. 2. In-memory database 116 may include data or messages from other sources than those describe with reference to FIG. 2. In-memory module may also perform some, all, different, or a combination of the transformations disclosed.

Figure 3:
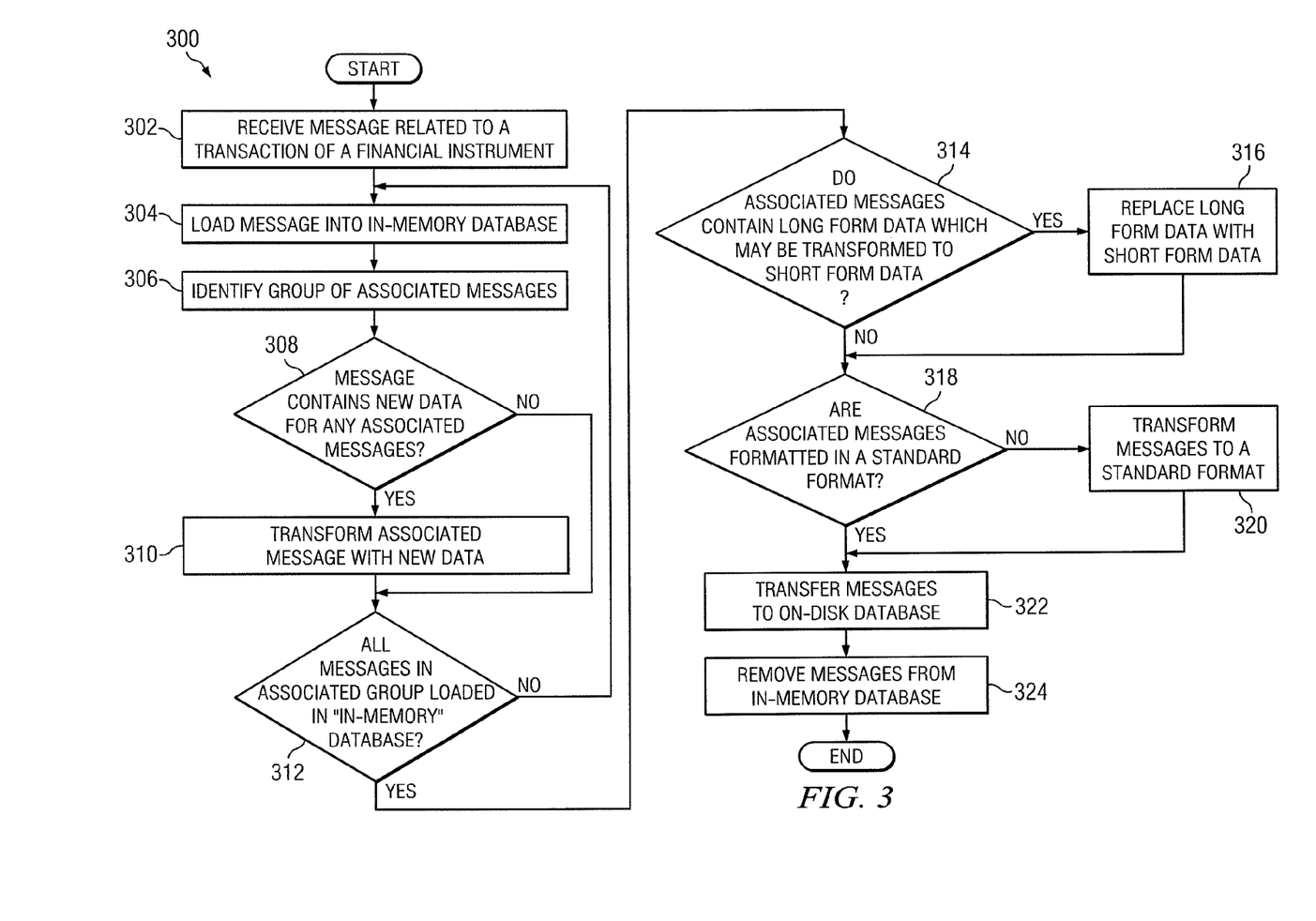
FIG. 3 illustrates a flow chart of an embodiment of a method to store messages in a database.

FIG. 3 illustrates a flow chart of an embodiment of a method to store messages in a database. Messages may represent any electronically communicable information. In an embodiment, messages are associated with transactions of financial instruments. The method 300 begins at step 302 when in-memory module 112 receives a message.

At step 304, in-memory module 112 loads a first message into in-memory database 116. At step 306, in-memory module 112 identifies an associated group of messages related to the first message in in-memory database 116. Messages may be associated because the messages relate to a common a common transaction, client, financial instrument, order type, message type, to comply with regulations, or other useful grouping.

At step 308, in-memory module 112 determines whether the first message contains new data for the group of associated messages. A standard format may require one or more messages in the associated group to contain the new data from the first message. If the first message contains new data, method 300 continues from step 310 and in-memory module 112 transforms one or more messages in the associated group with the new data from the first message. If the first message does not contain new data, the method 300 continues from step 312.

At step 312, in-memory module 112 determines if all the messages in the associated group have been loaded into in-memory database 116. If all messages in the group of associated messages have not been loaded, the method reverts to step 304. If all messages in the group of associated messages have been loaded, the method continues from step 314.

At step 314, in-memory module 112 determines whether any of the associated messages contain long form data 222 that can be transformed to short form data 224. Long form data 222 may be data in the associated group of messages for which in-memory module 112 maintains a relationship with short form data 224, but has not been replaced with short form data 224. In an embodiment, in-memory module 112 may keep long form data 222 in some messages, such as a first message in an associated group, but may not replace long form data 222 in other messages. In another embodiment, in-memory database 116 may replace all long form data 222 with short form data 224. If the associated group of messages contains long form data 222 that can be transformed to short form data 224, the method continues from step 316 and in-memory module 112 replaces long form data 222 with short form data 224. If the associated group of messages does not contain long form data 222 that may be transformed to short form data 224, the method continues from step 318.

At step 318, in-memory module 112 determines whether the messages in the associated group are formatted to a standard format. As discussed above, messages from various entities may have different formats. In-memory module 112 may convert messages to a standard format to maintain message consistency. Transforming messages to a standard format may include any one or a combination of adding data to a message, removing data from a message, replacing data in a message, changing the order of data in a message, dividing a message into multiple messages, changing the size of the message, or any other suitable data transformation. If any messages in the associate group are not in a standard format, the method continues from step 320 and in-memory module 112 transforms messages to a standard format. If all the messages in the associated group are in a standard format, the method continues from step 322. At step 322, in-memory module 112 transfers the associated group of messages to on-disk database 120. The method 300 then continues from step 328 and in-memory module 112 deletes the associated group of messages from in-memory database 116.

Modifications, additions, or omissions may be made to method 300. System 100 may identify an event that signals in-memory module 112 to transfer the group of associate messages to on-disk database 120. The signal may be a time, an event, a command from enterprise 130, or any other event. In an embodiment, in-memory module 112 transfers all messages in in-memory database at a particular time of day, for example, after the financial markets have closed. The method may include more, fewer, or other steps. Additionally, steps may be performed in any suitable order.

Figures 4A, 4B:
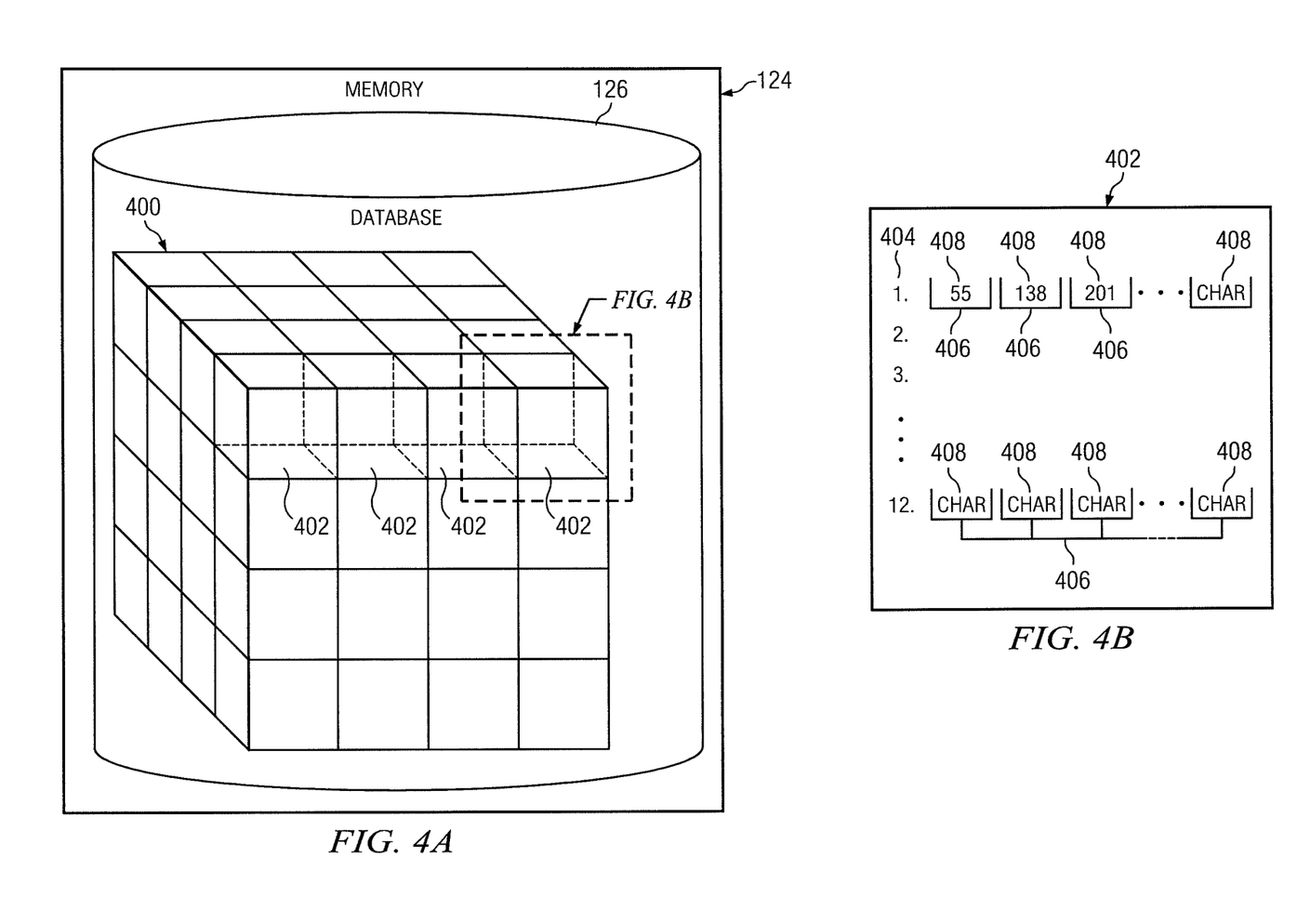
FIG. 4A illustrates a diagram of an embodiment of a duplicate processing database.
FIG. 4B illustrates a detailed view of an embodiment of an element of an array in a duplicate processing database.

FIG. 4A illustrates a diagram of an embodiment of a duplicate processing database 122 and FIG. 4B illustrates a detailed view of an embodiment of an element 402 of an array 400 in duplicate processing database 122. In an embodiment, duplicate processing database 126 includes an array 400 comprising a number of array elements 402. Array elements 402 represent sections of memory 124. Array elements 402 may be a uniform size, and may be uniquely identifiable by their location relative to an origin point of array 400. In an embodiment, duplicate processing module 122 receives messages over network 102 and converts each message into a hash 404 of the original message using a hash algorithm. Any suitable hash algorithm, or combination of multiple hash algorithms, may be used to convert a message to hash 404. Duplicate processing module 122 may use multiple hash algorithms to create two separate hashes of the original message, then combine the two separate hashes into a combined final hash 404 of the original message. In an embodiment, duplicate processing module 122 uses two separate hash algorithms, e.g., an MD-4 and an MD-5 hash algorithm, to create two hashes of the original message. Multiple hashes may be combined by concatenating the hashes, shuffling the hashes, applying another transformation to the hashes, mapping the hash positions to a combined hash, or any other suitable method that provides the same hash 404 for a particular input. In an embodiment, duplicate processing module 122 combines a 16 byte MD-4 and a 16 byte MD-5 hash by concatenating the two hashes into a combined 32 byte hash 404.

Duplicate processing module 122 stores hash 404 of the message in array element 402 within duplicate processing database 126, which includes array 400. In the illustrated embodiment, array 400 is a cubic array that is 256 elements long on each axis. Therefore, array 400 has 256 array elements 402 on each axis. Duplicate processing module 122 may determine an element 402 to store hash 404 by using the specific values from hash 404. According to the illustrated embodiment, hash 404 includes a plurality of character positions 406, and each character position 406 includes values 408.

In the illustrated embodiment, array 400 is three dimensional and three coordinates are necessary to identify each array element 402. Each character position 406 of hash 404 may have values 408 between 0 and 255. Each value 408 may have one of 256 different values and each axis of array 400 is 256 elements long. Duplicate processing module 122 may determine three character positions 406 whose values 408 may be used as coordinate locations of array 400 to identify a specific array element 402. For example, duplicate processing module 122 associates the first character position 406 with the x-axis of array 400, the second character position 406 with the y-axis of array 400, and the third character position 406 with the z-axis of array 400. In an example, the first, second, and third character positions 406 of hash 404 may have character values 408 of 55, 138, and 201, respectively. Duplicate processing module 122 identifies array element 402 at coordinates (55, 138, 201) of array 400.

Hash algorithms inherently output even distributions of character values 408. Therefore, using character value 408 to determine the coordinates of element 402 in which to store hash 404 results in an even distribution of hashes 404 throughout elements 402 of array 400. This inherent property of hash algorithms prevents duplicate processing module 122 from attempting to store more hashes 404 in element 402 than element 402 has memory, and allows system 100 to more efficiently allocate memory 126 to duplicate processing module 122.

Duplicate processing module 122 may search the identified element 402 for duplicates of hash 404. Element 402 stores a fraction of the total number of hashes stored in array 400. Identifying element 402 where a duplicate of hash 404 will be stored reduces the time and computing requirements to check the array 400 for duplicates. If duplicate processing module 122 finds a duplicate of hash 404 already stored in element 402, duplicate processing module 122 may instruct system 100 to discard the message and duplicate processing module 122 discards the hash. If duplicate processing module 122 does not identify a duplicate of hash 404, it may store hash 404 in array element 402.

In addition to identifying duplicate data related to financial transactions, duplicate processing module 122 may be used in other applications. Converting data to hash 404 is relatively fast and does not require a large amount of computing resources. Using character values 408 of particular character positions 406 of hash 404 to identify array elements 402 in which to store data allows the data to be quickly retrieved. Instead of searching the entire database, another hash of the data may be created, which will reveal the coordinates of array element 402 where the data is stored.

In an embodiment, data may be stored based on a particular date or other criteria. If the date format is normalized, a specific date will always convert to the same hash 404. To search for data from Jan. 1, 2000, the normalized form of Jan. 1, 2000 may be converted to hash 404, and hash 404 will provide the location of array element 402 storing data from Jan. 1, 2000. Therefore, the entire array 400 is not searched for the specific data. Storing data based on character values 408 of hashes 404 is an effective method to pre-sort databases, and an effective method to search databases.

In another embodiment, a database may store large volumes of small, discrete pieces of data. The size of the data being stored is often similar to the size of an index of the data in memory, i.e., a pointer to the memory location of the data would be approximately the same size as the data itself. For this type of database, creating indexes for every piece of data would approximately double the necessary memory. Alternatively, creating hash 404 of a piece of data can be done quickly, and, as described above, hash 404 can provides the memory location of the data.

Modifications, additions, or omissions may be made to duplicate processing module 122. The number of dimensions of array 400, the shape of array 400, the length of the axis of array 400, the location of the origin, and the method of identifying elements 402 may be different from the examples described. Array 400 may have any suitable size, shape, and dimensions. Any suitable system may be used to identify individual elements 402 of array 400. Any portion of array 400 may be the origin from which elements 402 are identified. Character values 408 may also have any number of different values.

The amount of memory allocated to each element 402 may be dynamic, and may be any suitable size supported by available memory. To make efficient use of memory 126, the amount of memory to allocate each element 402 may be calculated by determining the amount of data to be stored in array 400 and dividing that amount by the number of elements 402 in array 400. In an example, array 400 may need to store up to 200,000,000 32 byte hashes. The total data to be stored is (32 bytes*200,000,000 messages), and the number of elements is (256×256×256). An efficient allocation of memory for each element would be (6,400,000,000 bytes/16,777,216 elements)=approximately 381 bytes per element 402. In this example, each element 402 has the capacity to store approximately twelve 32 byte hashes.

Any suitable method may be used to utilize character values 408 of hash 404 to identify element 402 of array 400 to store data. For example, any of character positions 406 of hash 404 may be associated with an axis of array 400. Further transformations may be made to values 408 of character positions 406 to identify an element 402 of array 400, e.g., a function may be applied to character value 408 to map to a new value, which may be used as a coordinate of array 400.

Figure 5:
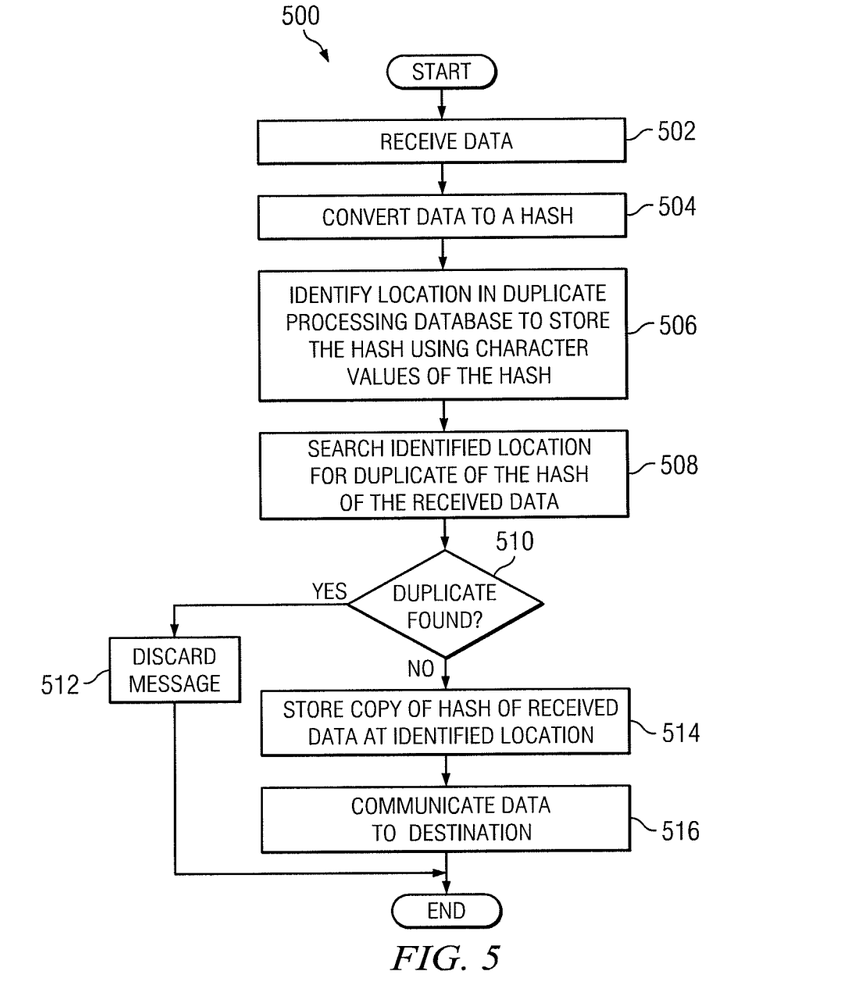
FIG. 5 illustrates a flow chart of an embodiment of a method for identifying duplicate messages.

FIG. 5 illustrates a flow chart of an embodiment of a method for identifying duplicate messages. The method 500 begins at step 502, when duplicate processing module 122 receives messages. The messages may be any type of electronically communicable information. In an embodiment, the messages are related to a transaction of a financial instrument.

At step 504, data processing module 122 converts the message to hash 404 using a hash algorithm. Duplicate processing module 122 may use any suitable hash algorithm or any suitable combination of hash algorithms. In an embodiment, data processing module 122 uses multiple hash algorithms to convert the data to multiple separate hashes, and then combines the separate hashes to create a combined hash 404 of the data. The separate hashes may be combined by concatenating character positions 406, alternating character positions 406, mapping character positions 406, substituting character positions 406, converting character values 408 according to a function, or any other suitable method to combine hashes 404 such that the a particular message will always convert to a particular hash 404. In an embodiment, data processing module 122 uses an MD-5 and an MD-4 hash algorithm to create two separate hashes of the data and then concatenates the two hashes to create a combined hash 404.

At step 506, the duplicate processing module 122 identifies a location in duplicate processing database 126 to store hash 404 of the received data. Duplicate processing database 126 may include an array 400. Each element 402 of array 400 represents a block of memory 124 that is uniquely identifiable by its location from an origin point of array 400. Each element 402 may also be a uniform size. Duplicate processing module 122 may identify a specific element 402 to store hash 404 by using the character values 408 of character positions 406 in hash 404.

In an embodiment, array 400 is three dimensional and three coordinates are necessary to identify an individual element 402. Each character 408 of hash 404 may have value 408 between 0 and 255, or 256 different values, and each axis of array 400 is 256 elements long. Duplicate processing module 122 may determine three character positions 406 whose character values may be used as coordinate locations of element 402 in array 400. For example, duplicate processing module 122 associates the first character position 406 with the x-axis of array 400, the second character position 406 the y-axis of array 400, and the third character position 406 with the z-axis of array 400. Duplicate processing module 122 may store hash 404 in element 402 at the appropriate coordinates of array 400.

At step 508, duplicate processing module 122 searches element 402 identified at step 506 for duplicates of hash 404.

At step 510, duplicate processing module 122 determines whether a duplicate of hash 404 is already stored in element 402.

If data processing module 122 finds a duplicate, method 500 continues from step 512 and system 100 discards the data, and duplicate processing module 122 discards the hash of the data. If duplicate processing module 122 does not find a duplicate of hash 404, the method 500 continues from step 514 and duplicate processing module 122 stores hash 404 in element 402 and instructs system 100 to pass the data to its destination. In an embodiment, if no duplicate is found, system 100 transfers the data to an in-memory module 112.

Modifications, additions, or omissions may be made to the method 500. The method may include more, fewer, or other steps. Additionally, steps may be performed in any suitable order.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A hardware system for storing messages in an on-disk database (ODDB), comprising:
    an interface operable to receive a first message comprising first data from an execution venue, wherein the first message is one of a group of associated messages related to a financial transaction;
    a processor communicatively coupled to the interface, the processor is operable to:
    load the first message into an in-memory database (IMDB), wherein the IMDB is stored on a semiconductor memory that utilizes integrated circuits to store data;
    determine whether the first data from the first message contains new data for the group of associated messages;
    identify an associated message in the group of associated messages;
    transform the associated message with the first data from the first message in the IMDB; and
    determine whether all messages in the associated group of messages have been loaded into the IMDB;
    the interface is further operable to:
    transfer the first message to the ODDB, wherein the ODDB is stored on a disk memory that mechanically orients a storage medium in relation to a write head to store data; and
    receive a second message comprising second data from the execution venue, wherein the second message is one of the group of associated messages related to the financial transaction;
    a memory is operable to store the second data in a table; and
    the processor is further operable to:
    determine a short form of the second data, wherein the short form requires less memory to store than the second data;
    associate the short form with the second data in the table;
    replace the second data with the short form in the second message;
    determine whether the first message is in a standard format;
    select a portion of the first data to transform into the standard format; and
    transform the selected portion of the first data in the first message to third data in the standard format.

2. The system of claim 1, wherein the processor is further operable to:

determine a maximum message size, wherein the maximum message size is optimized for efficient loading of messages into the ODDB according to data loading characteristics of the disk memory and the semiconductor memory; and transform the first message into a message having a size less than the optimized maximum message size.

3. The system of claim 1, wherein the ODDB is a database larger than 100 gigabytes.

4. The system of claim 1, wherein the first message is transferred to the ODDB at a predetermined time.

5. The system of claim 1, wherein the interface is further operable to transmit at least one of the group of related messages in a standard format to a financial transaction regulatory client.

6. A non-transitory computer readable medium comprising logic for storing messages in an on-disk database (ODDB), the logic, when executed by a processor, operable to:

receive a first message comprising first data from an execution venue, wherein the first message is one of a group of associated messages related to a financial transaction;

load the first message into an in-memory database (IMDB), wherein the IMDB is stored on a semiconductor memory that utilizes integrated circuits to store data;

determine whether the first data from the first message contains new data for the group of associated messages;

identify an associated message in the group of associated messages; transform the associated message with the first data from the first message in the IMDB;

determine whether all messages in the associated group of messages have been loaded into the IMDB;

transfer the first message to the ODDB, wherein the ODDB is stored on a disk memory that mechanically orients a storage medium in relation to a write head to store data;

maintain, in a memory, a table;

receive a second message comprising second data from the execution venue, wherein the second message is one of the group of associated messages related to the financial transaction;

store the second data in the table;

determine a short form of the second data, wherein the short form requires less memory to store than the second data;

associate the short form with the second data in the table;

replace the second data with the short form in the second message;

determine whether the first message is in a standard format;

select a portion of the first data to transform into the standard format; and transform the selected portion of the first data in the first message to third data in the standard format.

7. The computer readable medium of claim 6, further operable to:

determine a maximum message size, wherein the maximum message size is optimized for efficient loading of messages into the ODDB according to data loading characteristics of the disk memory and the semiconductor memory; and transform the first message into a message having a size less than the optimized maximum message size.

8. The computer readable medium of claim 6, wherein the ODDB is a database larger than 100 gigabytes.

9. The computer readable medium of claim 6, wherein the first message is transferred to the ODDB at a predetermined time.

10. The computer readable medium of claim 6, further operable to transmit at least one of the group of related messages in a standard format to a financial transaction regulatory client.

11. A method for storing messages in an on-disk database (ODDB), comprising:

receiving a first message comprising first data from an execution venue, wherein the first message is one of a group of associated messages related to a financial transaction;

loading the first message into an in-memory database (IMDB), wherein the IMDB is stored on a semiconductor memory that utilizes integrated circuits to store data;

determining whether the first data from the first message contains new data for the group of associated messages;

identifying an associated message in the group of associated messages;

transforming, using a processor, the associated message with the first data from the first message in the IMDB;

determining whether all messages in the associated group of messages have been loaded into the IMDB;

transferring the first message to the ODDB, wherein the ODDB is stored on a disk memory that mechanically orients a storage medium in relation to a write head to store data;

maintaining, in a memory, a table;

receiving a second message comprising second data from the execution venue, wherein the second message is one of the group of associated messages related to the financial transaction;

storing the second data in the table;

determining a short form of the second data, wherein the short form requires less memory to store than the second data;

associating the short form with the second data in the table;

replacing the second data with the short form in the second message;

determining whether the first message is in a standard format;

selecting a portion of the first data to transform into the standard format; and transforming the selected portion of the first data in the first message to third data in the standard format.

12. The method of claim 11, further comprising:

determining a maximum message size, wherein the maximum message size is optimized for efficient loading of messages into the ODDB according to data loading characteristics of the disk memory and the semiconductor memory; and transforming, using the processor, the first message into a message having a size less than the optimized maximum message size.

13. The method of claim 11, wherein the ODDB is a database larger than 100 gigabytes.

14. The method of claim 11, wherein the first message is transferred to the ODDB at a predetermined time.

15. The method of claim 11, further comprising transmitting at least one of the group of related messages in a standard format to a financial transaction regulatory client.

* * * * *